United States Patent [19]
Dutton et al.

[11] Patent Number: 6,072,585
[45] Date of Patent: Jun. 6, 2000

[54] METHOD AND APPARATUS FOR MANAGING THE POWER CONSUMPTION OF A PRINTER

[75] Inventors: Todd Alan Dutton; David Brian Langer, both of Lexington; Jeffrey Thomas Hines, Nicholasville; Steven Wayne Parish; Phillip Byron Wright, both of Lexington, all of Ky.

[73] Assignee: Lexmark International, Inc., Lexington, Ky.

[21] Appl. No.: 08/989,534

[22] Filed: Dec. 12, 1997

[51] Int. Cl.[7] .................................................. G03G 15/00
[52] U.S. Cl. ...................... 358/1.12; 358/1.14; 358/1.01; 399/12; 399/13; 399/88; 399/89; 399/90
[58] Field of Search ................................... 395/112, 113, 395/114, 101; 399/89, 12, 13, 88, 90

[56] References Cited

U.S. PATENT DOCUMENTS

| | | | |
|---|---|---|---|
| 4,075,699 | 2/1978 | Schneider et al. | 364/492 |
| 4,156,866 | 5/1979 | Miller | 340/146.1 C |
| 4,210,901 | 7/1980 | Whyte et al. | 340/310 R |
| 4,454,509 | 6/1984 | Buennagel et al. | 340/825.69 |
| 4,598,286 | 7/1986 | Miller et al. | 340/825.06 |
| 4,656,475 | 4/1987 | Miller et al. | 340/825.06 |
| 4,847,781 | 7/1989 | Brown, III et al. | 364/492 |
| 4,899,131 | 2/1990 | Wilk et al. | 340/518 |
| 4,949,359 | 8/1990 | Voillat | 375/106 |
| 5,140,349 | 8/1992 | Abe et al. | 346/160 |
| 5,287,353 | 2/1994 | Buda et al. | 370/85.1 |
| 5,317,366 | 5/1994 | Koshi et al. | 355/202 |
| 5,327,121 | 7/1994 | Antles, II | 340/825.51 |
| 5,349,905 | 9/1994 | Taylor et al. | 101/488 |
| 5,481,249 | 1/1996 | Sato | 340/825.06 |
| 5,483,517 | 1/1996 | Kurata et al. | 370/13 |
| 5,485,246 | 1/1996 | Hayashi et al. | 355/202 |
| 5,600,310 | 2/1997 | Whipple, III et al. | 340/825.06 |
| 5,758,249 | 5/1998 | Dutton et al. | 399/391 |

*Primary Examiner*—Mark R. Powell
*Assistant Examiner*—Lance W. Sealey
*Attorney, Agent, or Firm*—Frederick H. Gribbell, Esq; D. Brent Lambert

[57] ABSTRACT

An improved printer is provided which includes a print engine control program that minimizes the power consumption of the paper-handling devices to allow for a smaller DC power supply. Some of the paper-handling devices are input paper trays, output paper stackers, and a duplexer, which all preferably contain a microcontroller and an individual electric motor drive. The base printer also contains a microcontroller in the print engine that controls the printer's mechanisms and various subassemblies that are used in the laser electrophotographic printing process. To maintain control of the entire paper path, the print engine sends commands to the paper-handling devices, and these devices send responses to these commands. Most of the printer's paper-handling devices receive their electrical power entirely from the base printer, which is supplied as a DC voltage. The print engine avoids the concurrent running of subsystems in cases where the functionality of the printer is not compromised. These subsystems are instead run sequentially, so their power demands do not overlap, thereby providing a reduced overall power consumption requirement that is being supplied by the printer's DC power supply. Another aspect of the present invention allows the printer to command either all or only certain individual paper-handling devices to place themselves into a "power saver" mode.

23 Claims, 8 Drawing Sheets

METHOD AND APPARATUS FOR MANAGING THE POWER CONSUMPTION OF A PRINTER

TECHNICAL FIELD

The present invention relates generally to printing equipment and is particularly directed to printers of the type which control the overall power consumption of the printer so as to operate with a minimally-sized DC power supply. The invention is specifically disclosed as a laser printer that has a power saver mode of operation, and that prevents certain paper-handling devices from being energized at any given moment in time by allowing only a pre-determined number of the printer-controlled devices to simultaneously be drawing inrush current upon the initial energization of a motor.

BACKGROUND OF THE INVENTION

Many conventional printers are provided with relatively complex paper-handling devices, including input paper trays and output paper stackers which each have their own motors and internal control logic. Under certain conditions, it is important for the paper-handling devices (including these input paper trays and output paper stackers) to be placed into a "homing mode" so that the main printer is assured that the paper-handling devices are being set into a particular known configuration. This is almost always the case when a printer is first turned on, or is otherwise put through a reset cycle.

Some of the more complex printers can be provided with optional paper-handling devices that can be added to the printer, in which individual motor drives are provided with such paper-handling devices that are controlled by logic commands from the print engine or some other control logic that is derived from the main printer system controller. In some situations, the print engine can communicate to the paper-handling devices using logic signals that are communicated over separate physical electrical conductors. Alternatively, the control signals could be transmitted over a dedicated communications bus or communications channel, that would act as a type of multiplexer at the printer control end and a de-multiplexer at the paper-handling device end, so that when a particular type of signal is sent, the correct paper-handling device is made aware that it is now supposed to become activated.

Another type of communications scheme could be one where certain coded messages are sent over a communications bus that acts much as a data or address bus in a microprocessor-memory system, and at the receiving end, the correct "address", once deciphered, would then cause the paper-handling device to become activated. Of course, more than one type of message could be directed at the same paper-handling device, so that a homing command would be interpreted as such, as opposed to some other type of energization or de-energization command.

In some conventional printers, upon a reset or upon a warmup situation, all of the paper-handling devices could be simultaneously placed into their homing modes. If that occurred, then multiple motors or motor-driven mechanisms would turn on concurrently, and the instantaneous power consumption would suddenly jump to a very high value with respect to the printer's power supply output current rating. This situation would be exacerbated if the fuser would also be energized during that same time interval by DC power. Therefore, the printer's power supply output rating was required to be quite large as compared to its "normal" output loading during standard operating conditions of the printer. This peak power demand requirement would occur when the paper-handling devices were simultaneously energized regardless of whether or not each paper-handling device had its own individual motor, or whether there was a much larger motor that supplied a separate mechanical drive to multiple paper-handling devices. The situation in which each paper-handling device has its own individual motor is probably the worst case scenario, because each of the motors that initially becomes energized will have a relatively large instantaneous "inrush" current demand as it begins to turn from zero RPM (revolutions per minute) and then accelerates toward its full-speed RPM, which draws a large current surge from the DC power supply to overcome its torque requirements when driving its associated load, especially during the initial moments of rotation.

Reducing peak power consumption in electrical systems has been practiced for many years with respect to industrial plants and commercial buildings. For example, electrical load controllers are often provided that include time schedules for particular pieces of electrically-energized equipment so that certain equipment may be turned off during certain times during the day. These time schedules might also include a parameter which specifies a certain maximum amount of time where the particular piece of electrical equipment may be continuously turned off, however, that piece of equipment must then be allowed to again be energized so it can perform its intended function without causing a major detrimental effect to its overall system. For example, in a system which requires electrical motors to provide the driving force for air pumps or air compressors, or to provide the driving force for a pressurized water system, it may be possible to turn off one or more electric motors while other similar motors remain running, thereby reducing the peak power consumption of the system. However, the overall performance of that system will become significantly degraded if the situation is allowed to continue operating under that condition indefinitely, so one of the air or water pumps must be allowed to be added to this system after a certain time interval, during which some other unrelated system may be required to shut down one of its electrical motors.

Other ways of reducing the peak electrical demand of a control system can be used in situations where energy may be stored in some manner as potential energy in a form other than electricity. One such example is where a chilled water system "pre-cools" a building during the early morning hours when the rest of the utility company's electrical distribution system is in a relatively minimal power consumption operating state. This pre-cooling is achieved by causing certain interior spaces (such as large conference rooms of a convention center) to be cooled to a much lower temperature than is normally required and then later allowing this very cool room to gradually warm up during the peak electrical demand portions of the day by not having the chilled water system provide as much cooling as would otherwise be required without this pre-cooling step.

Some of the power consumption control systems have been patented, including U.S. Pat. No. 4,210,901 (by Whyte), which discloses a distribution network power line communication system that is divided into addressable communication zones defined by signal repeaters located at spaced intervals along the distribution network. The repeaters are connected between the primary and grounded neutral conductors of the primary distribution network. Each repeater has a unique address that can be interrogated from a central communication terminal. The messages are transmitted over high-voltage power lines, and once a repeater and a remote terminal device has been selected by the unique address, a code can be transmitted to the remote terminal that indicates which automatic function is to be performed by the remote terminal.

U.S. Pat. No. 4,454,509 (by Buennagel) discloses a load management system which includes a central message generator and a plurality of addressable remote load controllers that, in response to transmitted messages, selectively connect and disconnect high power deferrable loads. The load controllers have means for translating coded tone input signals into digital data. The message format includes two code sets, a zone code set and a command/address code set. All load controllers having a common zone identifier are responsive to a "scram" instruction message that is directed to that zone. This scram message is designed to be able to disconnect a large number of deferrable electrical loads in a short time period to avoid a blackout.

U.S. Pat. No. 4,949,359 (by Voillat) discloses a system that transmits data between a master station and a plurality of slave stations where there is a simultaneous return of data back to the master station, and this is accomplished on a bus having only two conductors. The digital signals sent by the master station to the slave stations are also control signals that feed power to the slave stations. The data bits of these signals have a wave form shape such that there are "dead zones" during which the signals have no effect and during which the transmission may be interrupted by putting a high impedance on one of the conductors, which allows a momentary alteration of the signal. The presence or absence of such an alteration constitutes data that is being transmitted from a slave station to the master station.

U.S. Pat. No. 5,287,353 (by Buda) discloses a communication system between a microprocessor and a network of several remote input/output repeater modules that control various devices. A synchronous serial communications protocol is used when a microprocessor transmits data packets sent to the repeater modules. The data packets have an output data byte for each of the repeaters that sets the state of the output devices connected to the repeater modules.

U.S. Pat. No. 4,075,699 (by Schneider) discloses a power controlling/load shedding system that includes power consumption metering. A central processing unit (CPU) includes a memory that stores a data table that characterizes each electrical load in the system under each of the hierarchy of operational levels. Circuits are also provided to turn local and remote loads on or off in response to CPU-issued commands. The CPU can project energy consumption over a monitoring interval. If power must be shed, loads are examined seriatim and the loads are selectively shed on a priority basis as required.

Some of the conventional energy management control systems are designed to reduce the overall power consumption of homes. An example of this is U.S. Pat. No. 4,847,781 (by Brown), which discloses an energy management system that uses a central control unit to provide energy management signals to a plurality of subscriber units. More specifically, the central control unit is provided by the electrical utility company, the subscriber units are placed in homes, and the energy management signals are transmitted over TV cables, power lines, telephone lines, or free space radio frequency transmissions. Certain appliances within the homes will be managed with regard to whether they are allowed to operate, or to be turned off during certain time intervals. Each appliance will include a responder unit so that it can receive messages from the central control unit. Each subscriber can enter a particular code to use a schedule of on- or off-times for each of the responders. These codes are supplied to the subscribers, and the responder will then respond only to codes that conform to the code set used in the encoding devices within each responder.

Another patent that discloses a conventional energy management control system to reduce the overall power consumption of homes is U.S. Pat. No. 4,899,131 (by Wilk), which discloses a control system having a central unit that applies a DC operating current and control signals to a two line bus. The central unit applies a direct current to the bus, as well as an electrical signal. The system is designed to be a local control system for loads in a home, and can use one-way communication to automatically switch a load on or off. It can also use two-way communication, using an alarm loop which can detect a change in the direct current level on the bus, wherein a current response constitutes a message from a peripheral unit to the central unit. The change in current of the two-wire bus can be measured by a series resistor, as well as by other devices. A "manual control unit" (such as a keyboard) can be used to load the bus, and can be used to inhibit such loading of the bus. Control signals are sent to terminal units, which are used to either connect or disconnect one of the system loads.

U.S. Pat. No. 5,600,310 (by Whipple) discloses a household appliance having a serial bus control system that includes a system controller and a plurality of slave nodes. Each slave node is a sensor or an actuator, and is responsive to a particular slave node address code generated by a master communications module at the system controller. The master communications module includes an interrogation circuit that transmits digital messages to the slave nodes and receives sensor signals from slave nodes. The system controller can sense the condition of the appliance and generate control signals to optimize energy efficiency. This includes the ability to power down the control circuitry to reduce energy consumption during periods when the appliance is idle. When the power-down circuitry is used, it typically slows the update periodicity of the controller, and power is shut down to unused peripherals.

The prior art also includes attempts to limit the peak power requirements of certain types of printers. One example of this is disclosed in U.S. Pat. No. 5,349,905 (by Taylor), which discloses a thermal ink jet printer that uses a copy speed feed control for reducing peak power requirements. The incoming print data is evaluated by the printer to determine the image density, or in an alternate embodiment the excess power consumption to dry the ink in a dryer is measured. The speed of the sheet transport system is controlled in accordance with the image density so that the speed of the sheet at the printer and/or at the dryer is reduced at high image densities. In the first mode of operation, the image density is evaluated (based on raster pixel density), and the result provides a signal to a servo-control system that sets the speed of the variable-speed drive motor that controls the speed of the belt that transports the paper through the printer. In this manner, it is possible to have each sheet of a print job travel through the printer at varying rates of speed depending upon the print density in each area of the sheet. In the alternative embodiment, a microwave dryer is operated at a fixed power output. The amount of power in excess of that needed to dry the ink on the page is absorbed in a dummy load, and if very little power is being absorbed in the dummy load, this is an indication that the dryer is operating close to optimum speed for the density of printing being dried. If the power dissipated in the dummy load is high, that indicates the amount of ink to be dried is low, and the speed of the belt can be increased.

Another example patent is U.S. Pat. No. 5,317,366 (by Koshi), which controls the AC power provided to multiple electronic photo printers. An AC branch circuit power source is described as having only a 15 Ampere capacity (e.g., at 120 VAC). whereas the power consumption of each printer is in the range of 7 to 8 Amperes. The heat rollers ordinarily consume the greater part of the power in the electronic photo printer, and it is important to not have all of the photo printers energized simultaneously as far as providing power to their individual heat rollers. Otherwise, the power consumption will exceed the 15 Ampere capacity of the branch circuit, and a circuit breaker will open, disabling all of the photo printers.

In one example of a 7 Ampere printer, Koshi will allow two of the printers to be turned on simultaneously, but will prevent the next printer from energizing its heat roller until after the time interval has expired for a pulse of current being supplied to one of the previously energized printers, thereby allowing the next printer to eventually have its heat roller energized without causing the circuit breaker to open. To delay the power supply from energizing the heat roller of the "next" photo printer, the power supply voltage is measured at the printer just before it is time to energize its heat roller. If the voltage has fallen below a certain threshold, that is an indication that a large amount of current is already being consumed by the other photo printers. In this circumstance, the "next" printer will not have its heat roller energized just yet. Once the pulse current has been turned off to one of the previously powered printers, the voltage level will rise above the threshold, and the "next" printer can then have its heat roller energized. The printer having its heat roller energization delayed will not be able to instantly begin operations, however, it will only be delayed by a small amount of time, and this benefits the overall system by preventing a power outage when the circuit breaker would open where the Koshi invention was not being used.

It would be desirable to provide a printer that purposefully controls the initial energization of its various electrically-powered devices, and particularly controls the paper-handling devices that contain their own individual electric motor. It is even more important to have the printer control such devices during a homing operation, which would generally occur after a power on reset of the printer.

SUMMARY OF THE INVENTION

Accordingly, it is a primary object of the present invention to provide a printer that controls the operations of its paper-handling devices so as to prevent the energization of certain devices during the same time interval, and therefore, to reduce the peak power consumption being drawn from the printer's DC power supply.

It is another object of the present invention to provide print engine control logic of a printer that avoids running subsystems concurrently in cases where the functionality of the printer is not compromised by running those subsystems sequentially so that the power demands of the subsystems do not overlap in time, thereby reducing the maximum demand on the printer's DC power supply, and therefore lowering its manufacturing costs.

It is a further object of the present invention to provide a printer that operates some or all of its paper-handling devices in a power saver mode, to reduce overall power consumption of the printing system.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printer is provided which includes a print engine control program that controls the power consumption of the paper-handling devices so as to keep the necessary power output rating of the DC power supply to a minimum. Some of the paper-handling devices are input paper trays, output paper stackers, and a duplexer, which all preferably contain a microcontroller and at least one individual electric motor drive. The base printer also contains a microcontroller in the print engine that controls the printer's mechanisms and various subassemblies that are used in the laser electrophotographic printing process. The print engine controller has the overall responsibility for controlling the entire paper path, although portions of which are locally controlled within the paper-handling devices.

The print engine communicates to the paper-handling devices via a two-wire serial bus, which transmits and receives bytes of information via a transmit data line and a receive data line. To maintain control of the entire paper path, the print engine sends commands to the paper-handling devices, and these devices send responses to these commands. Most of the printer's paper-handling devices receive their electrical power entirely from the base printer, which is supplied as a DC voltage. The printer's DC power supply is designed to handle a fully-configured system, which potentially could contain all of the non-self-powered devices that simultaneously may be attached to the printer. To reduce the manufacturing cost of the printer, the power supply output rating is kept to a minimum, using the principles of the present invention described below.

The print engine avoids running subsystems concurrently in cases where the functionality of the printer is not compromised. These subsystems are instead run sequentially, so that their power demands do not overlap, thereby providing a reduced overall power consumption requirement that is being supplied by the printer's DC power supply. When the printer is first powered on, the printer and its paper-handling devices re-initialize many of their subsystems. For example, the printer runs the transport motor and the laser printhead motor, while the duplexer and output stackers home their mechanisms, which involves running their transport motors. The print engine has control over exactly when these devices home their mechanisms, and controls these mechanisms so that only one at a time begins energizing its transport motor. This type of homing operation would also occur after an intervention condition, such as a paper jam, has been cleared.

Another situation using the principles of the present invention is where one of the input paper trays "picks" a sheet of media from the stack of unused media located in the paper tray. This operation produces an instantaneous peak power demand on the DC power supply, and this is true both for the input tray that is internal to the printer and for external input paper trays, since their power also is supplied by the base printer. This power peak occurs for approximately the first one hundred milliseconds after the pick motor is turned on to start the picking operation. The single internal tray is directly controlled by the print engine, and the print engine can also control exactly when one of the external input tray devices begins its media pick operation. The print engine can guarantee that there will not be any two pick operations overlapping in time, so that there will not be more than one power peak of one of the input trays occurring simultaneously. Furthermore, the print engine can guarantee that the input paper tray media-picking power peak will not be concurrent with the energization of the solenoid of the envelope conditioner attached to the printer, or any other peak power critical operation within the printer system.

During a paper picking operation, the print engine control system can either infer that the power peak has ended after a certain time interval, or can directly measure a parameter that indicates the fact that the power peak has ended. One method of directly measuring the power peak is to provide a current transformer at the motor that provides power to the mechanical paper-driving mechanism. One way of inferring that the power peak has ended is to measure the distance the paper has traveled after the picking operation has begun. This could be performed by a photo sensor that directly measures the paper's position, or the paper position could be calculated from information that the motor has turned a certain distance, or that a stepper motor has moved a certain number of steps, and then assuming the power peak has terminated after one of those events.

Another aspect of the present invention allows the printer to command either all or only certain individual paper-handling devices to place themselves into a "power saver" mode. Each of the paper-handling devices has at least one electric motor to drive various paper moving mechanisms, and also has at least one paper position detecting sensor. If the printer is relatively inactive, then it can command all of the motor driven mechanisms of the paper-handling options to be powered down, essentially by turning off the one or more motors in the paper-handling device. Furthermore, if the paper positioning sensors comprise optoelectronic sensors, then the light sources in such sensors draw a significant amount of current. These light sources can be turned off in each of the paper-handling devices by a command from the print engine. Of course, once the printer requires the use of a particular paper-handling device, then its paper positioning sensors can be immediately commanded to have their light sources turned back on, and their motor-driven mechanisms also can be immediately turned back on.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
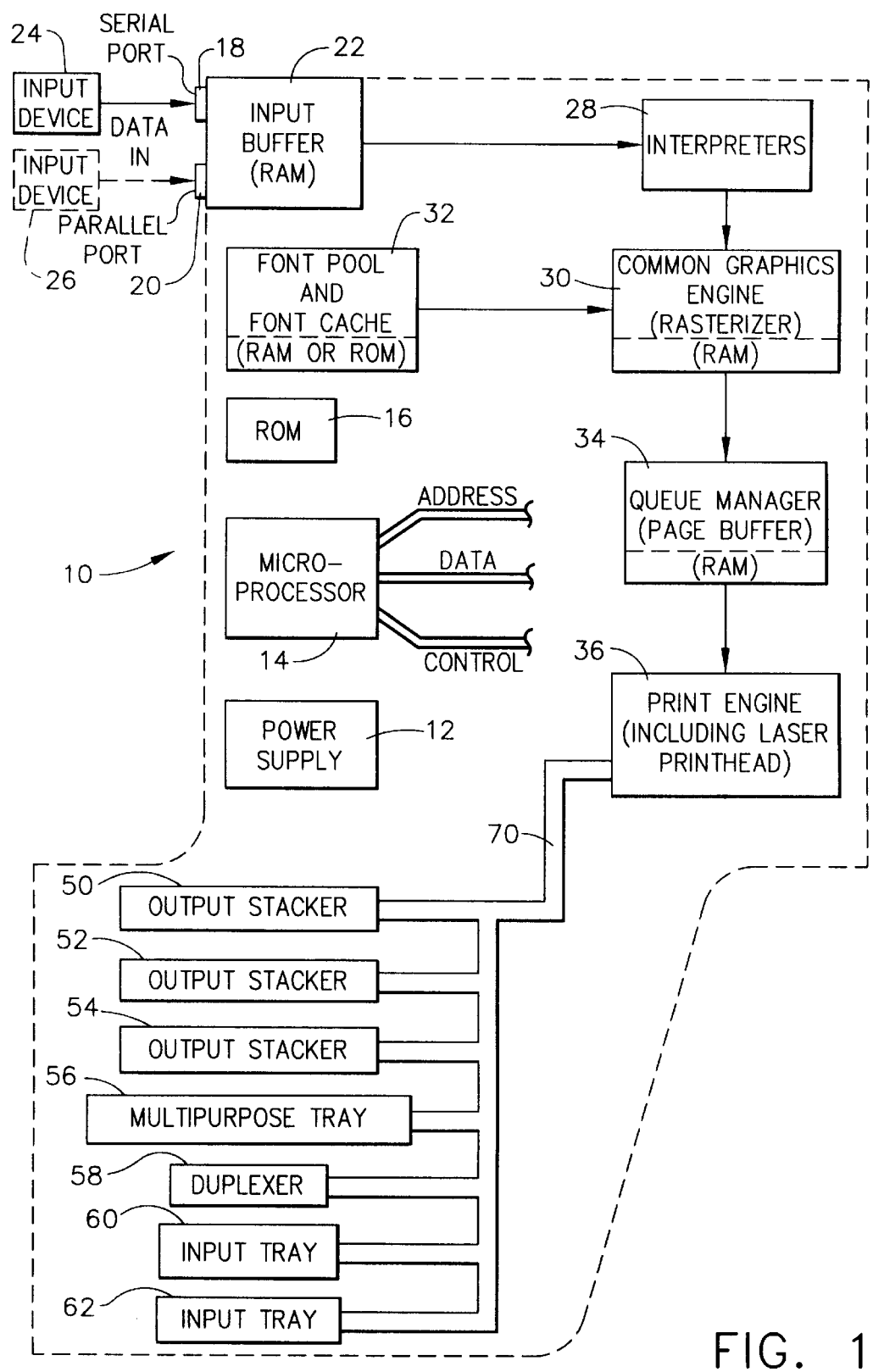
FIG. 1 is a block diagram of the major components of a laser printer, as constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided by software operations into several portions for performing several different functions.

Laser printer 10 also contains at least one serial input or parallel input port, or in many cases both types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a Queue Manager or page buffer, which is a portion of RAM designated by the reference numeral 34. In a typical laser printer, an entire page of rasterized data is stored in the Queue Manager during the time interval that it takes to physically print the hard copy for that page. The data within the Queue Manager 34 is communicated in real time to a print engine designated by the reference numeral 36. Print engine 36 includes a laser light source within its printhead (not shown), and its output 40 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers.

Print engine 36 contains an ASIC (Application Specific Integrated Circuit) (not shown), which acts as a controller and data manipulating device for the various hardware components within the print engine. The bitmap print data arriving from Queue Manager 34 is received by the ASIC, and at the proper moments is sent in a serialized format to the laser printhead.

The print engine 36 is in communication with a number of paper-handling devices via a communications bus 70. Some of the paper-handling devices depicted on FIG. 1 include three output stackers 50, 52 and 54, a multipurpose tray 56, a duplexer 58, and two input trays 60 and 62.

Figure 2:
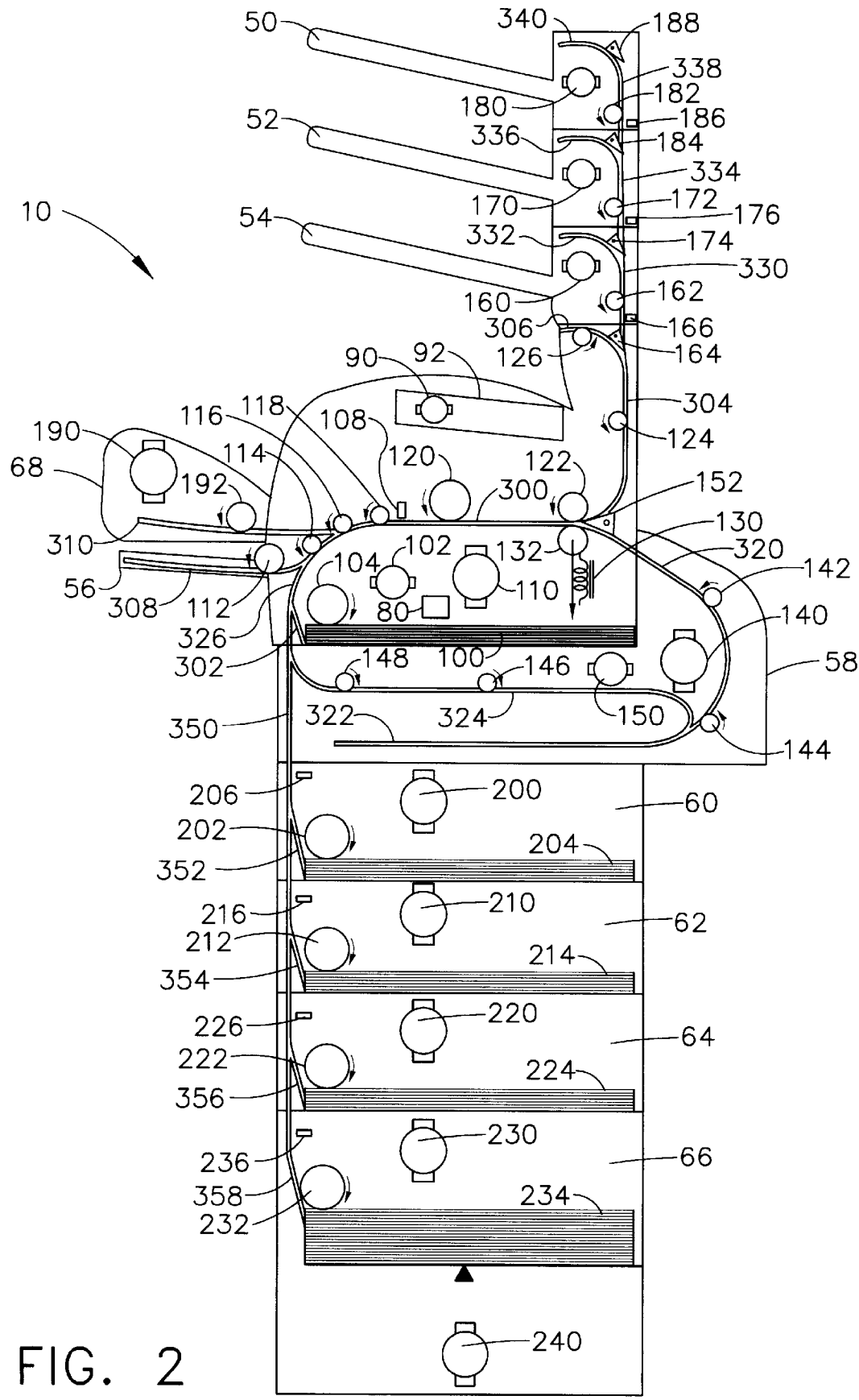
FIG. 2 is a diagrammatic view of the paper path diagram for a laser printer having multiple input trays and multiple output stackers, as constructed according to the principles of the present invention.

The paper-handling devices and the paper pathways are depicted in greater detail on FIG. 2. Printer 10 comprises a "base printer" which includes a multipurpose tray 56, an internal input paper tray 100, and several drive devices. These drive devices include a DC motor 102 that drives a pick roller 104, which is used for a picking operation from the internal tray 100. Another DC motor 110 provides the drive for several different rollers within the base printer. These rollers include the pick roller 112 used for feeding print media from multipurpose tray 56, and drive rollers 114, 116, and 118 that transport the print media toward the laser printhead 92 (which is part of print engine 36). The placement and number of drive rollers depicted on FIG. 2 are chosen for the purpose of clarity in this description of the present invention. It will be understood that additional drive rollers would typically be included in an actual implementation of such a printer.

A photoconductive drum 120, which is contained within a print cartridge (not shown), provides the transport through the laser printhead area, and fuser rollers 122 and 132 provide the transport just before reaching a diverter 152. Finally, output rollers 124 and 126 transport the print media away from the fuser area. If no optional output stackers are provided with the base printer 10, then the print media automatically follows the pathways 300, 304, and 306, after which the print media exits and lands on the output "tray" at the top surface of the base printer 10.

A DC power supply 12 is included in the base printer 10, which provides power to the DC motors throughout the printer system and preferably is a 24 volt DC supply. This power supply 12 also provides DC power to the microprocessor and other low-voltage components of printer 10 (see FIG. 1).

Another DC motor 90 is included in a laser printhead 92, which provides power to the rotating faceted mirror (not shown) used as part of the laser beam aiming system. A fuser backup roll solenoid 130 is provided to move fuser backup roller 132 away from the heated fuser roller 122 in order to reduce wrinkling of envelopes. On FIG. 2, the duplexer option is installed at 58. A stepper motor 150 provides the mechanical drive for the diverter 152 which is used to either allow the print media to travel to the output portion of the printer (along pathway 304), or to divert the paper into the duplexer along pathway 320. If the print media is diverted into the duplexer 58, then DC motor 140 provides the mechanical drive to rollers 142, 144, 146, and 148. The print media travels pathways 320, 322, and 324, before being returned into the input pathway at 326. If the sheet of print media was originally picked from the internal tray 100, it would have first followed the pathway 302, then under the photoconductive drum 120 via pathway 300, before entering the duplexer. After the sheet entered the pathway 322, it would then be turned upside down by being transported through pathway 324 before arriving back at the input pathway 326.

The base printer 10 also includes multipurpose tray 56, and print media could enter the input pathway 326 from the multipurpose tray's pathway 308, using the roller 112 which is driven by DC motor 110. An optional envelope feeder 68 is also depicted on FIG. 2, which allows an envelope to be used as the print media. The envelope would follow the pathway 310 while being transported by a roller 192, which is powered by a DC motor 190.

The base printer 10 also includes at least one paper (or other type of print media) positioning sensor, as seen at the reference numeral 108. Of course, other paper sensors can be included in printer 10 at various locations, without departing from the principles of the present invention. In many cases, the paper positioning sensors preferably are optoelectronic devices, which have a light source that typically is a light emitting diode (LED). This provides a means for sensing the position of a sheet of paper or other print media.

FIG. 2 also depicts several other optional input trays 60, 62, 64, and 66. Input tray 60 includes a DC motor 200 which drives a pick roller 202 that can pick a sheet of print media from the tray 204. The print media, once picked, follows a pathway 352 and becomes sensed by a print media sensor 206 as the sheet approaches the input pathway 350.

The input tray 62 includes a DC motor 210 which drives a pick roller 212 that picks a sheet of print media from the tray 214. Once picked, the print media is transported along a pathway 354, past a paper positioning sensor 216, and ultimately arrives in the input pathway 350.

Input tray 64 includes a DC motor 220 which provides the drive to a pick roller 222. Pick roller 222 can pick a sheet of print media from the tray 224, and this print media follows a pathway 356 which directs the print media past a sensor 226.

Input tray 66 is an optional high capacity tray and includes a stepper motor 240 (which alternatively could be a DC motor) that can position the stack of print media at 234 so that it feeds properly into the pathway 358. Input tray 66 includes a DC motor 230 which provides drive to a pick roller 232. Once a sheet of print media is picked, it is transported along pathway 358 past a paper positioning sensor 236, and ultimately arrives at the input pathway 350.

It will be understood that it typically is not desirable to have more than one input tray picking a sheet of print media simultaneously with a similar picking operation of another of the input trays. However, the pathway in FIG. 2 is sufficiently long that, since there are several optional input trays attached to the base printer 10, more than one input tray could be performing a picking operation simultaneously without the print media from the two different trays actually overlapping. To reduce the peak power that must be provided by power supply 12 to the various DC motors of the base printer and its optional associated paper-handling devices, it is desirable to allow only one picking operation to occur at any given moment. This will be discussed in greater detail hereinbelow.

FIG. 2 also depicts several optional output stackers, such as stackers 50, 52, and 54. Stacker 54 includes a stepper motor 160 (which alternatively could be a DC motor) that provides mechanical drive to a roller 162, and a diverter 164. If a sheet of print media that exits the printhead area is to be transported into the output stacker 54, then diverter 164 must be actuated to a position which directs the print media along the pathway 330 instead of the pathway 306. The output stacker 54 also includes a paper positioning sensor 166. Once the print media is transported along the pathway 330, it will then exit along pathway 332 into the output stacker 54.

Output stacker 52 operates in a similar fashion, and includes a stepper motor 170 (which alternatively could be a DC motor). This motor provides mechanical drive to a roller 172 and a diverter 174. A paper positioning sensor 176 is also provided as part of stacker 52. If a sheet of print media is to be exited at output stacker 52, then diverter 174 is positioned to prevent the print media from entering the pathway 332, and instead directs the print media along pathway 334, finally exiting via pathway 336.

The top output stacker 50 includes a stepper motor 180 (which alternatively could be a DC motor), which provides mechanical drive to a roller 182 and a diverter 184. A paper positioning sensor is also provided at 186. For print media to exit the output stacker 50, diverter 184 must be actuated to prevent the print media from exiting pathway 336, and instead directing the print media to follow the pathway 338 and exit via the pathway 340. A final diverter 188 is also depicted on FIG. 2, but would not be used unless a further output stacker were added.

The power supply 12 must provide DC power to all of the DC motors and stepper motors that are depicted on FIG. 2 (except for motor 230 and 240, since option 66 is powered by a separate DC supply [not shown]), as well as the fuser backup roll solenoid 130. If all of these motors were to be actuated simultaneously, then the peak power drawn from the DC power supply 12 would be approximately 258 Watts, at 24 volts DC. Such a power supply could, of course, be provided with base printer 10, however, a much smaller power supply would be sufficient to provide all of the power requirements for printer 10 and its options, so long as the principles of the present invention are observed. A smaller power supply will naturally be less expensive, consume less physical space within the base printer 10, and will generate less heat due to excess power dissipation due to the less than perfect efficiency of the power supply itself.

Figure 3:
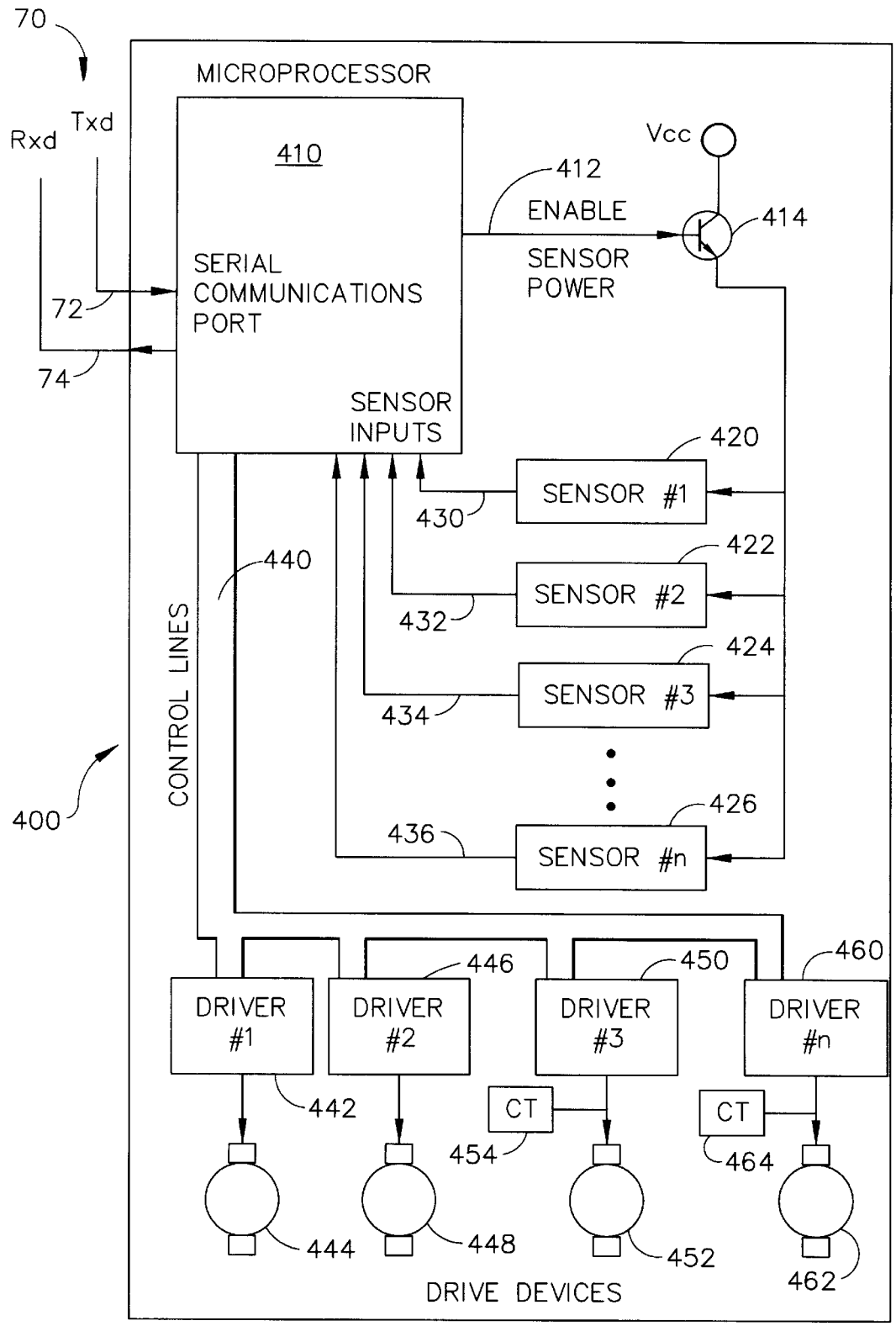
FIG. 3 is a block diagram of the main electrical components that are found in one of the paper-handling devices, such as an input tray, found on FIG. 2.

FIG. 3 shows the main components of one of the optional paper-handling devices depicted on FIG. 2. FIG. 3 depicts a fairly complicated paper-handling device, since it illustrates several positioning sensors and several different drive motors. Many paper-handling devices are not as complicated and do not have the number of sensors or drive devices as shown on FIG. 3. One type of duplexer, for example, manufactured by Lexmark International, Inc. contains two optical positioning sensors and two drive devices, such as a stepper motor 150 and a DC motor 140, respectively. The communications bus 70 comprises a transmit data line 72 and a receive data line 74. These data lines are connected into a microprocessor 410, via a serial communications port. Microprocessor 410 includes hardware inputs and outputs, and a single microcontroller integrated circuit could be used for microprocessor 410.

One of the outputs is a digital output at 412 that enables power for the sensors. The paper positioning sensors on FIG. 3 are generally designated by the reference numerals 420, 422, 424, and 426. A transistor 414 is used as a switch to either provide power to these sensors, or to disconnect such power. Assuming the sensors are optoelectronic sensors, they will have a light source that requires electrical current to make the sensors operative, and the output side of the sensors is a digital signal at reference numerals 430, 432, 434, and 436, respectively. These signals are directed to digital inputs of microprocessor 410.

Several control lines at 440 are used to enable the various motors of the paper-handling device 400. These signals from control lines 440 provide an on or off signal to the electronic driver circuits, generally depicted by reference numerals 442, 446, 450, and 460. Each driver circuit provides the proper voltage and current for its respective drive device, and these devices are depicted by the reference numerals 444, 448, 452, and 462. Each of these drive devices is a motion inducing apparatus for a paper roller, a diverter, or some other mechanism that moves a paper tray position or backup roll, for example. Motor 444 could be a stepper motor, and the device at 448 could be a solenoid. The motors at 452, and 462 could be DC motors, and their drive current could be measured by a current transformer 454 or 464, respectively.

It will be understood that many various types of motors or drive inducing devices can be used in a paper-handling device such as the device 400 on FIG. 3 without departing from the principles of the present invention. Furthermore, it will be understood that many different types of paper positioning sensors can be used other than optoelectronic devices, without departing from the principles of the present invention. Other types of sensors can be used in a printer, such as a limit switch to detect whether or not the printer cover is closed.

By use of the communications bus 70, the print engine 36 is able to command any of the paper-handling options, such as the input trays or output stackers to perform a function by simply sending a command to that particular device. Such commands preferably are in the form of a data message which includes the appropriate address of the paper-handling device for which the message is intended. An exemplary communications scheme for sending messages between the print engine and the paper-handling devices is disclosed in a co-pending commonly-assigned U.S. patent application Ser. No. 08/853,767, titled "Communication Scheme for Imaging Systems Including Printers with Intelligent Options, filed May 9, 1997, which is expressly incorporated herein by reference in its entirety.

The two-wire serial bus 70 is used when the print engine 36 sends a command to one of the paper-handling devices to start. In return, the paper-handling device sends a status response, which acknowledges that the command was received and that the paper-handling device has responded accordingly. Since the print engine can control precisely when it desires each of the paper-handling devices to operate, print engine 36 controls the start commands for these devices such that their peak power consuming operations do not overlap in time, at least for certain operations. For example, when the printer system is first powered on, the printer and its paper-handling devices will re-initialize many or all of their subsystems. The printer runs its transport motor and the laser printhead motor, while the duplexer and output stackers will home their mechanisms, which involves running their transport motors. In one instance, the duplexer 58 will home its mechanism only after it receives a "Mechanical Reset" command from print engine 36. Print engine 36 then polls duplexer 58 with a "Query Reset Complete" command, and duplexer 58 will indicate when it has finished its mechanical reset operations by a response to this command.

An intervention condition, such as a jam that has been cleared, will also cause the printer and its paper-handling devices to re-initialize some of their subsystems. When that occurs and the fuser is still relatively warm, this is termed a "warm POR" (a warm power-on reset), as compared to a "cold POR" when the printer is first powered on.

As will be seen below, since the fuser (not shown) that is provided with the base printer 10 is powered by AC voltage, no attempt need be made to make its initial warmup operation non-concurrent with the operation of the paper-handling devices and other subsystems that are provided with DC power. However, other design constraints force the printer to wait until the fuser is warm before operating the transport motor and the printhead motor. These considerations will become apparent in the flow charts and power timing diagrams that are discussed hereinbelow.

Figure 4:
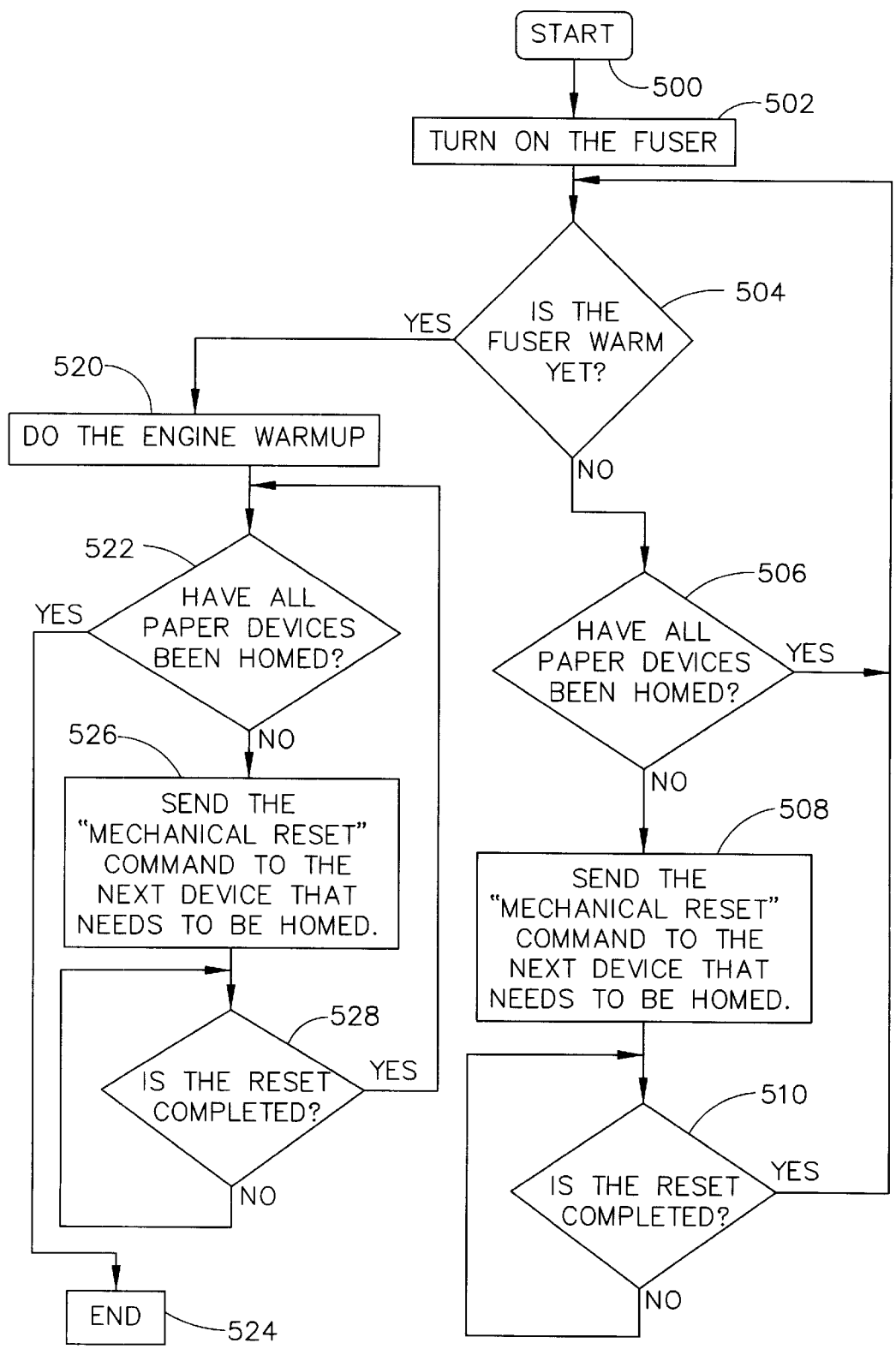
FIG. 4 is a flow chart of the control logic for staggering the homing of paper-handling mechanisms of the printer of FIG. 2.

FIG. 4 is a flow chart that shows the operational steps required for staggering the homing of the paper-handling devices of printer 10. Starting at a step 500, which could be the initialization step after a cold POR or after a warm POR, the fuser is turned on at a step 502. At a decision block 504, it is determined if the fuser has sufficiently warmed up to its operating temperature. If the answer is NO, a decision block 506 determines whether or not all of the paper-handling devices have been homed, where if the answer is YES, then the logic flow is directed back to decision block 504. If the answer is NO at decision block 506, then at a step 508 a "Mechanical Reset" command is sent to the next paper-handling device that needs to be homed.

A decision block 510 now determines whether or not the reset operation has been completed. If the answer is NO, then the logic flow merely returns to that decision block 510 until the answer becomes YES. Once that occurs, the logic flow is directed back to decision block 504. It will be understood that it is preferred to provide printer 10 with a multitasking operating system in which many sub-functions are performed virtually simultaneously. Therefore, when the logic flow of a flow chart is "stuck" in a "DO-loop", the entire printer is not actually in a holding pattern from which the printer can never escape until a particular condition has been satisfied. Instead, the printer is performing many other tasks while this particular "DO-loop" is being performed, before the printer can move to the next step of that particular sub-function.

Once decision block 504 detects that the fuser has come up to its operating temperature, the logic flow is directed to a step 520 in which the print engine performs its warmup functions. This includes turning on the mirror motor 90, as well as testing and adjusting the power of the laser light source.

After the engine has warmed up, a decision block 522 determines whether or not all of the paper-handling devices have been homed. If the answer is YES, then the end of this sub-function has been reached at a step 524. If the answer is NO, then a step 526 sends a "Mechanical Reset" command to the next paper-handling device that needs to be homed (essentially just like at step 508). After that has occurred, a decision block 528 determines whether or not the reset of that device has been completed. Once the answer becomes YES, the logical flow is directed back to decision block 522. This sub-function will remain in the flow chart in FIG. 4 until the fuser is warm, the print engine has performed its warm up operations, and all of the paper-handling devices have been homed.

As related above, the paper-handling devices require some type of mechanical drive for their mechanisms to become homed. Their power consumption requirements are such that it is preferred to make each of these homing operations be non-concurrent with the other homing operations of the other mechanisms. Each of the motors that drive the paper-handling devices has its maximum current draw during its initial acceleration after it is first turned on, thereby causing an inrush of current. The magnitude of this inrush current can be seen graphically with respect to FIGS. 6A and 6B which are discussed in greater detail below.

Figure 5A:
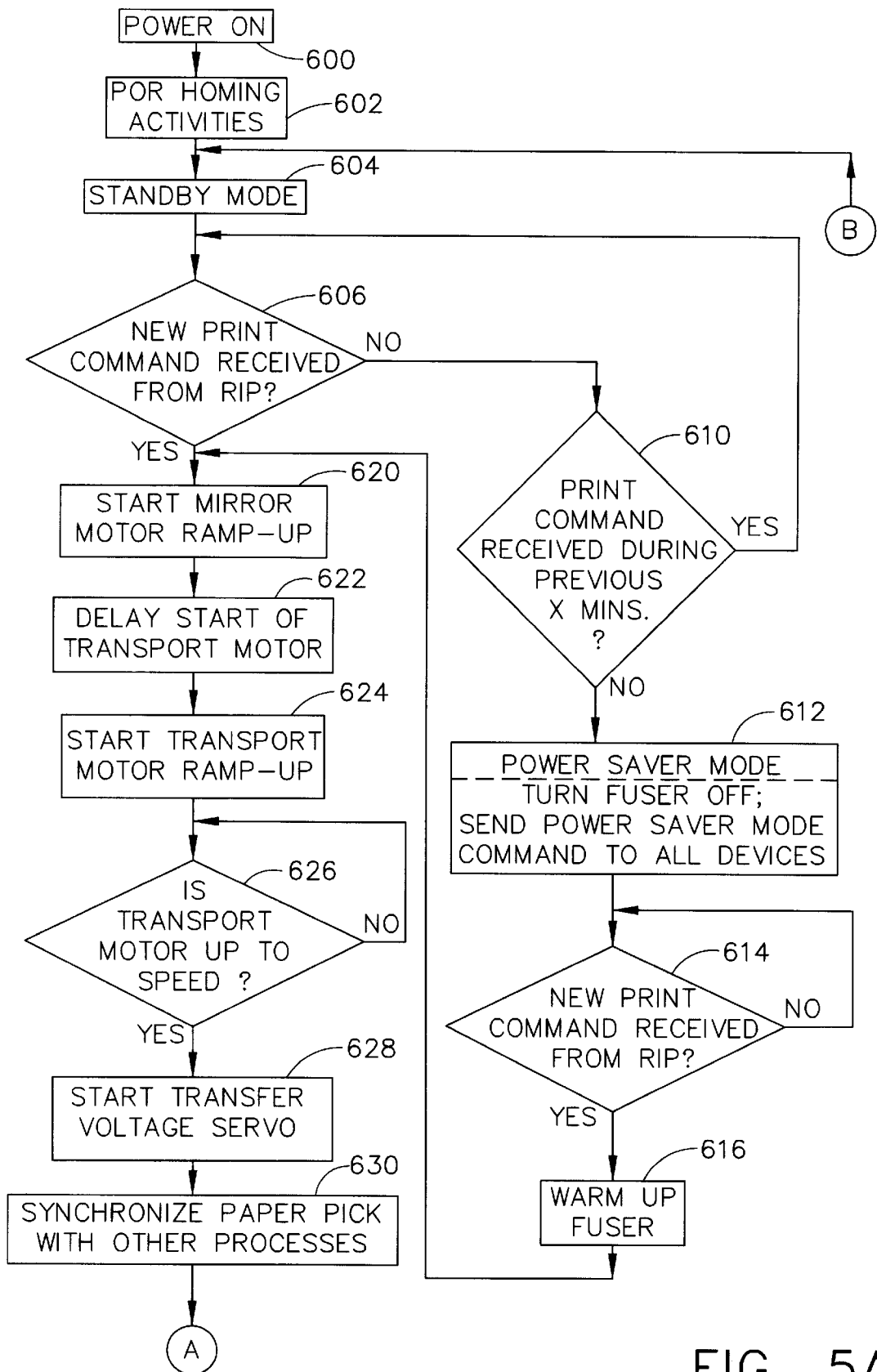
FIGS. 5A and 5B are a flow chart of the control logic for picking a sheet of media from an input paper tray of the printer of FIG. 2.
Figure 5B:
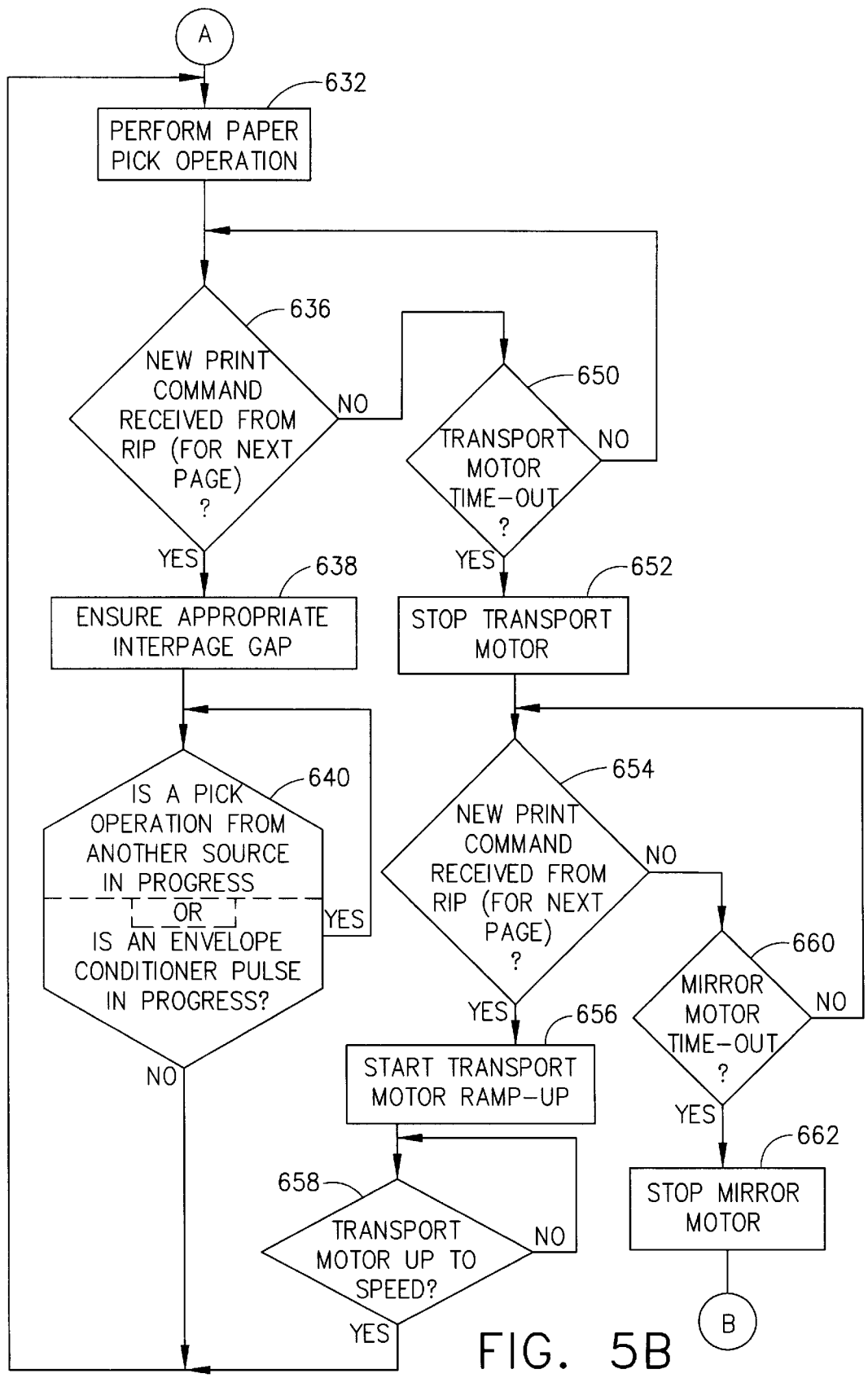

FIGS. 5A and 5B are a flow chart depicting the operational steps for picking a sheet of print media from one of the paper-handling devices of printer 10. The logic flow starts at a power ON step 600, after which the power-on reset (POR) homing activities take place at a step 602. This includes the homing activities of the paper-handling devices, as per the flow chart of FIG. 4.

Now that these activities have been accomplished, the printer is temporarily in a "standby" mode of operation, which is represented at a step 604 on FIG. 5A. A decision block 606 now determines whether or not a new print command has been recently received from the printer's raster image processing ("RIP") components, which can include the interpreters 28, common graphics engine 30, and the queue manager 34 (depicted on FIG. 1). If the answer is NO, the logic flow is directed to a decision block 610. If the answer is YES, then the logic flow is directed to a step 620 which starts the mirror motor ramp-up, which is the same as motor 90 on FIG. 2. As the mirror motor 90 is ramping up, the start of the transport motor 110 preferably is delayed for a dynamically calculated amount of time to reduce the overall run time of the photoconductive drum 120 and other rollers driven by transport motor 110. Therefore, a step 622 waits a short time interval before allowing the logic flow to arrive at a step 624 which starts the ramp-up of the transport motor 110.

With regard to an input tray pick operation, it is preferred that the beginning of a pick operation for any given media source in the printing system not occur during the ramp-up (acceleration) period of the printer's transport motor 110. Therefore, a decision block 626 delays any further operational steps until the transport motor is up to speed. Once that occurs, a step 628 starts the transfer voltage servo operation, which adjusts the power supply voltage output of a high voltage power supply 80. It is preferred that this calibration procedure of starting the transfer voltage servo occur only after the transport motor's acceleration ramp has been completed. It should be noted, however that the mirror motor 90 may still be accelerating during the transfer voltage servo operation at step 628.

At a step 630, the paper pick operation will preferably be synchronized with other processes in the printer. Therefore, an appropriate time delay will be introduced before any paper picking operation so that they will be synchronized with processes such as the mirror motor ramp-up, and completion of the transfer servo operation. Step 630 is not necessarily a power-saving step.

The logic flow now proceeds to a letter "A" on FIG. 5A, which directs the logic flow to a similar letter "A" on FIG.

5B. A step 632 now performs a paper (or other print media) pick operation.

The paper picking operation of step 632 requires the DC motor of the selected input tray to be energized, so that the pick roller will induce motion into the sheet of print media that is to be transported into the print engine 36. The initial rotation and acceleration of the DC motor that has been selected will require a certain amount of inrush current, which will also require a power peak demand to be supplied by the power supply 12. In the DC motors typically used in the present invention, the acceleration period and corresponding inrush current occurs within approximately the first 100 milliseconds after the pick motor is first energized. After that time interval, the pick motor has accelerated substantially to its steady state speed, and also will now be drawing its steady state current.

Using the principles of the present invention, it is preferred to not allow more than one acceleration period of a pick motor to overlap with the acceleration period of a second pick motor of the same printing system. Therefore, if a new print command has been received from the RIP for the next page, for example, then it is important to wait for a time period such that the leading edge of the current sheet will be located no closer than an interpage gap distance to the trailing edge of the previous sheet before proceeding with the next pick operation. On FIG. 5B, the logic flow to perform this task occurs at a decision block 636, and if the answer is YES, a step 638 waits for the appropriate interpage gap. This interpage gap can be determined with respect to a pick operation that will be performed by the same input tray as had performed the immediately preceding pick operation, or can be with respect to picking by a different input tray with respect to the immediately preceding pick operation.

A decision block 640 now determines if a pick operation from another source is presently in progress or if an envelope conditioner pulse is presently in progress. If the answer to either of these questions is YES, then the logic flow returns to the beginning of that decision block 640 and "loops" until the answer becomes NO for both questions. Once that occurs, the logic flow is directed back to step 632 to perform another paper pick operation. Decision block 640 is important to prevent the beginning of a pick operation for any given media source in the printing system from overlapping the peak power interval of a pick operation of any other media source in the system, and to prevent the overlap of any pulse of the envelope conditioner solenoid.

If at decision block 636 no new command has been received from the RIP to print another page, then the logic flow is directed to a decision block 650 to determine whether or not the transport motor time-out period has elapsed. If the answer is NO, then the logic flow is directed back to decision block 636 awaiting the next command from the RIP.

If the result at decision block 650 is YES, then the transport motor is stopped at a step 652. The logic flow is now directed to a decision block 654 that determines whether or not a new print command has been received from the RIP for another page. If the answer is YES, then a step 656 will start the transport motor ramp-up operation. After the transport motor has been initially started, a decision block 658 determines when the transport motor has come up to speed. Once that occurs, then the logic flow is directed back to step 632 so that the next paper picking operation can be performed.

If decision block 654 has not received a new print command from the RIP, then the logic flow is directed to a decision block 660 that determines whether or not the mirror motor has timed-out. If the answer is NO, the logic flow is directed back to decision block 654 waiting for the next print command from the RIP. If the result is YES at decision block 660, then the mirror motor is stopped at a step 662. The logic flow is now directed to the letter "B" on FIG. 5B, which redirects the logic flow back to the standby mode at step 604 on FIG. 5A.

Once in the standby mode, the logic at decision block 606 waits until a new print command is received from the RIP. As long as that has not occurred, the logic flow continually is directed to a decision block 610 which determines if there has been no print command received during a rather long time interval. This interval can be set by the user of the printer. Of course, there is also a factory default setting, which can be anywhere in the range of one (1) to sixty (60) minutes, depending upon the type of printing equipment that is involved. Once the result at decision block 610 becomes NO, it is obvious that the printer has not been needed for some time, and can now be placed into a "power saver mode." This is represented at a step 612, and once the power saver mode has been entered, the fuser is turned off, and the power saver mode command is sent to all of the paper-handling devices. The effect of this command will be discussed below, and such a command is sent via the serial communications bus 70 to all of the paper-handling devices in the printing system. The preferred printing system is capable of placing individual paper-handling devices into a power saver mode, while simultaneously actively using others of the paper-handling devices.

After the power saver mode has been entered, a decision block 614 determines whether or not a new print command has been received from the RIP. If the answer is NO, then a "DO loop" is continually performed at this logic step until the answer becomes YES. When that occurs, a step 616 commands the fuser to warm up, a "Restore Full Power" command is sent to all devices on the serial bus, and the logic flow is directed back to step 620 after the fuser has become warm. Of course, when that occurs the transport motor and the mirror motor are commanded to ramp-up, and a picking operation will be performed shortly thereafter.

When a picking operation of an input tray is to be accomplished, the DC motor will begin rotating for that input tray. For example, if input tray 60 needed to have a sheet of print media transported into the print engine, then DC motor 200 would start turning, and would start providing power to the pick roller 202.

It is important to know when the DC motor has finished its acceleration, since that will indicate that another paper-handling device can now operate without drawing an excessive amount of power from the printers power supply 12. One way to make this determination is to continually monitor the position of the DC motor (by use of an encoder, for example) and determine that the sheet of media has been properly picked and separated from the rest of the stack at 204. Of course, different types of print media have different thicknesses and electrostatic charges (at which the clear overhead projector sheets are usually the worst case), so the choice must be conservative if a particular fixed distance that the motor has rotated is to be used as the absolute determiner that the pick motor has settled into its steady-state current consumption. If the motor driving the pick roller was a stepper motor, then an encoder would not be necessary, but instead the number of steps that the stepper motor has been commanded to operate will instead be monitored.

Since the picking of different types of print media is load dependent with respect to the time needed for a certain number of steps or a certain angular rotation to occur representing the acceleration phase of the motor, the value chosen must be relatively conservative to accommodate all possible loads. The reason for this is that an absolute distance that the print media has traveled could take a different amount of time, depending upon the type of print media. Therefore, a mere timer after the motor has begun rotating may not be the best indicator as to the fact that the motor has achieved its steady-state operating mode.

Another way of determining that the motor driving a pick roller has achieved a steady-state operating speed is to place a print media sensor in a position so that when the print media leading edge reaches this sensor, one can be assured that the motor has already gone through its acceleration phase. This only represents an inference that the motor has actually achieved its steady-state speed, however, this is essentially the same inference as determining that the motor has turned a certain angular distance, or has stepped a certain number of steps.

Another way to determine that the motor has achieved its steady-state speed is to directly measure the operating parameters of the motor itself. In other words, the power consumption of the motor could be directly monitored by a current transformer, such as the current transformer 464 for the motor 462, depicted on FIG. 3. This assumes, of course, that the motor voltage is known throughout the acceleration and steady-state phases of the motor's operation. If this is not true, then a potential transformer may also be necessary.

Since current and potential transformers are extra components that certainly add extra cost, another way to determine that the motor has achieved its steady-state operating mode is to monitor the DC motor controller circuit. In the printer of the present invention, a DC motor controller that is used to drive the motor (such as the driver 460 for the motor 462 on FIG. 3) has an acceleration phase, a constant velocity phase, and a deceleration phase. The transition between phases can be detected, and this would provide a direct determination that the power consumption for the motor has fallen from its peak to its steady-state value.

For a motor that is driven by a pulse-width modulation driver circuit, the duty cycle can be monitored versus what is expected for a "normal" acceleration. Once the duty cycle settles down to a value that is expected for a steady-state operating condition, then a signal can be sent to the print engine to indicate that the particular motor is no longer accelerating, and is running under its normal power consumption steady-state value.

Regardless of the method for determining when the driving motor has achieved its steady-state speed (and thereby is not drawing an excessive amount of power), a message could be sent from the paper-handling device via the communications bus 70 to the print engine. In this manner, the intelligence required to make these determinations can be distributed to the paper-handling devices, and the processing power of the printer is only slightly affected by the need to receive such messages.

Figure 6A:
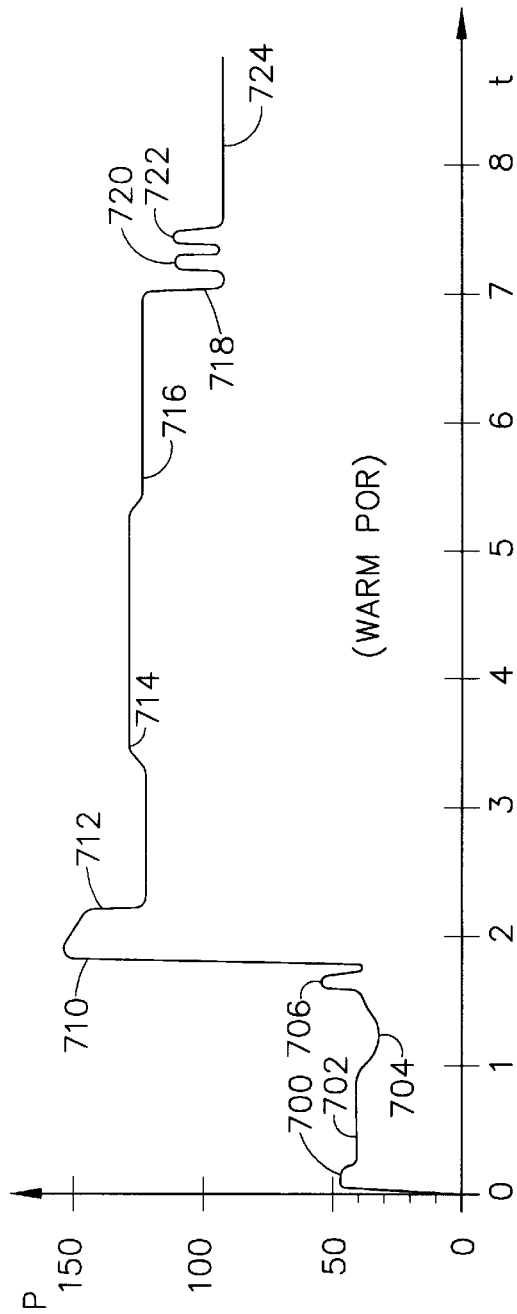
FIGS. 6A and 6B are graphs depicting instantaneous power vs. time of the printer of FIG. 2, after a "cold POR" and after a "warm POR."

FIG. 6A is a graph showing the relationship between power consumption "P" in Watts along the Y-axis and time "t" along the X-axis in seconds after a warm power-on reset has occurred for printer 10. If the printer has been in a standby mode, and then powered off for just a brief time interval, the fuser will be relatively warm at time=0. The power consumption will fairly quickly jump up to its first peak at reference numeral 700 as the duplexer 58 is homed. Other equipment running at this time includes the high voltage power supply 80, the electronics for the input trays, and a small power budget for other options attached to the printer, none of which is at peak power during this time period.

After the initial power surge at 700, the duplexer motor 140 accelerates toward its steady-state operating speed, although it is nevertheless supplying an increased amount of torque, hence its power consumption falls to the level shown at reference numeral 702.

Assuming the fuser is still not warmed up sufficiently to allow the print engine to start, then one of the output stackers is homed, which causes a relatively instantaneous peak power consumption, as shown by the peak at reference numeral 706. This power consumption peak lasts approximately 100 mSec, and falls off rather quickly.

In the example of FIG. 6A, the fuser now has become sufficiently warm to allow the print engine to start its mirror motor 90 and its main transport motor 110, thereby requiring another instantaneous power peak as shown at the reference numeral 710. At this time, the mirror motor 90 is still ramping up. In addition, the fans of the printer also begin operating at that time. The fans ramp-up fairly quickly. The ramp-up time of the transport motor lasts approximately 400 mSec, and the power then falls at 712 to a more steady-state value for the running transport motor.

Well after the transport motor 110 has achieved its steady-state power consumption operating mode, the high voltage power supply 80 will go into its calibration mode at 714, which starts the transfer voltage servo, and that requires the extra power seen at 714. The servo period lasts almost two seconds, and when it ends, the power consumption falls back to the previous value, as seen at 716.

The mirror motor finally finishes its ramp-up, and the power consumption falls at 718. Once this occurs, it is appropriate to allow the other output stackers to home their mechanisms, which then provides two more peak power consumption intervals, as depicted at 720 and 722. Each of these peak power intervals lasts approximately 100 mSec, and there is a small separation in time between the fall of the first peak at 720, and the rise of the second peak at 722. Once all the output stackers have been homed, the steady-state power consumption for the printer in its active state is shown at the reference numeral 724.

In the illustrated embodiment, the input trays do not pick any print media during a power-on reset operation, and therefore the autocompensator motors do not turn. Furthermore, the envelope feeder 68 also does not home during a power-on reset in the illustrated embodiment. If any of these mechanisms require one of their motors to operate during the warm power-on reset operation, then the curve depicted in FIG. 6A would show further peaks after the peak at 722. As according to the principles of the present invention, it is preferred that only one such paper-handling device have its initial acceleration occur at a given moment, and any such acceleration interval should be separated by a small amount of time to allow the current consumption of the previously-started device to fall.

Figure 6B:
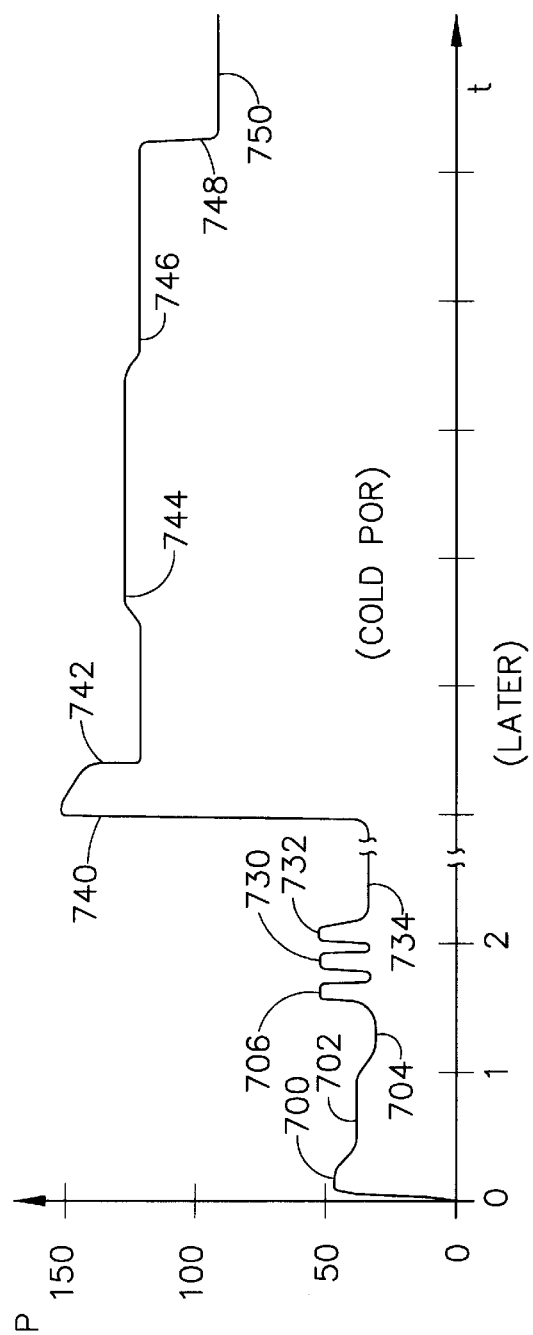

The graph of FIG. 6B is similar to that of FIG. 6A, however this depicts a "cold power-on reset" operation. In this case, the printer has been turned off long enough for the fuser to become relatively cold, and the printer is then turned on at time=0. The power consumption starts at zero Watts, and very quickly jumps up to the peak at 700. The initial power consumption at 700, 702, and 704 occurs for the same reasons as described above for FIG. 6A. Since the fuser will be cold for some time after a cold POR, it will be possible to home all of the output stackers before turning on the print engine. Consequently, there are three peaks in a row at 706, 730, and 732, each of these peaks representing the homing of one of the output stackers depicted on FIG. 2. After all of the output stackers 50, 52, and 54 have been homed, the power consumption falls to a steady-state value at 734.

After several seconds, the fuser will become warm enough to allow the print engine to start. At 740, the power consumption jumps to a new peak which occurs when the mirror motor 90 and the transport motor 110 start their ramp-up operations. In addition, the fans of the printer also begin operating at that time. The fans ramp-up fairly quickly, and the transport motor ramps up after about 400 mSec, as depicted at 742. Once that occurs, the power falls to a relatively steady-state value until the servo period for the high voltage supply occurs between 744 and 746 on FIG. 6B. Once the mirror motor 90 finally ends its ramp-up period, the power consumption falls again at 748 to a relatively steady-state value at 750. The printer is now ready for active operations, in which the print engine is running and the output stackers have been homed.

As noted above, during a power-on reset the illustrated embodiment requires no motors to be run during a reset of the input trays or the envelope feeder. If there were any homing operations to be required by these input trays, then their motors would not be allowed to start while any of the three output stackers were being homed, therefore, the peak power requirements needed by such motors of the input trays would show on FIG. 6B during the time interval at which the current is at level shown by reference numeral 704 or 734. Of course, if the fuser would happen to warm up before all of the input trays were homed, then the homing of further input trays would be prevented until after the transport motor and mirror motor have been ramped-up.

Figures 7, 8:
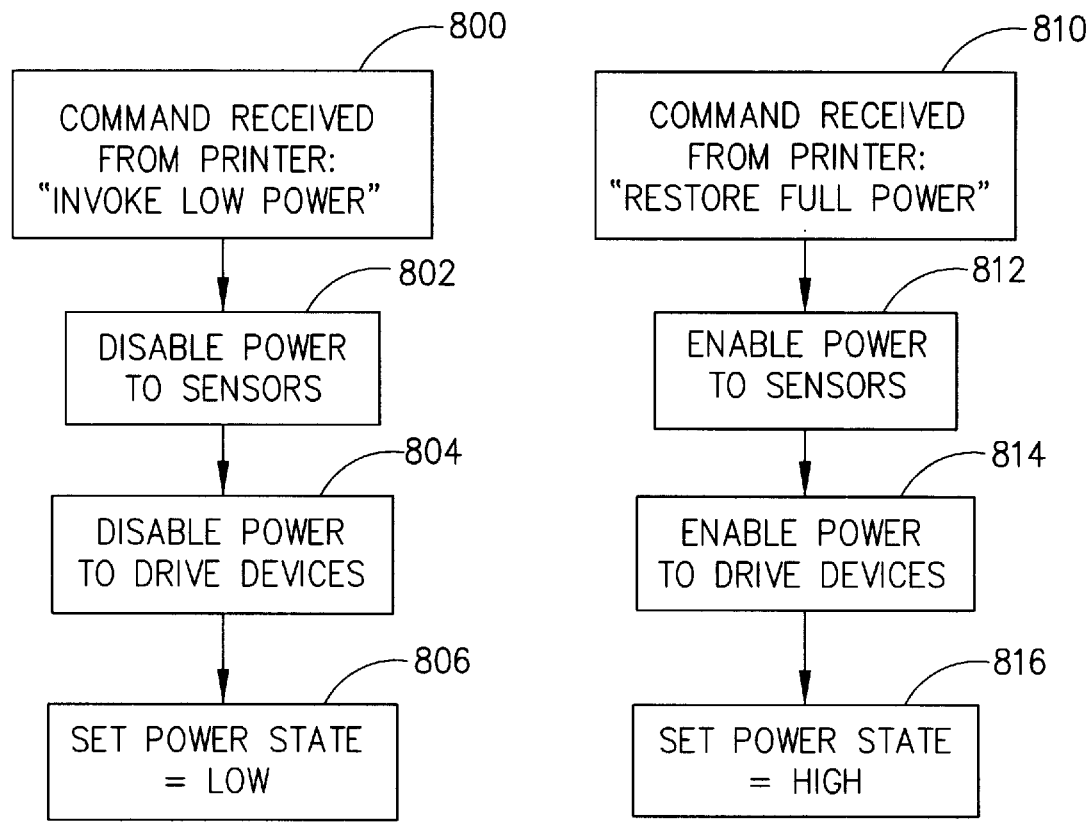
FIG. 7 is a flow chart of the control logic for entering a low power state of a paper-handling device used with the printer of FIG. 2.
FIG. 8 is a flow chart of the control logic for entering a high power state of a paper-handling device used with the printer of FIG. 2.

FIG. 7 is a flow chart showing the operational steps that are performed by one of the paper-handling devices when it is placed into its power saver mode of operation. The first step, at reference numeral 800, is for the paper-handling device to receive a command from the printer to invoke the low power state. Once that occurs, a step 802 disables power to all of the sensors that have an active component, such as an optoelectronic sensor. This can be accomplished, for example, by turning off the transistor 414 by the appropriate signal at 412, as depicted on FIG. 3.

The next step at 804 is to disable power to all of the drive devices in the paper-handling device. This would be accomplished, for example, by appropriate signals on the control lines 440 of the paper-handling device 400 shown on FIG. 3. Once the drivers are disabled, no power would be sent to any of the drive devices or actuators on FIG. 3.

The final step at 806 is to set the power state="low." Once that occurs, a message is sent back to the printer along the communications bus 70 that this particular paper-handling device is now in its low power state. As related above, the printer 10 is capable of turning every one of the paper-handling devices into its power saver mode, or it can command only certain individual of these paper-handling devices into their low power modes. This is useful in situations where only one of the input trays is being used over an extended period of time, and correspondingly only one of the output stackers is being used. The full power mode is not necessary for all of the other output stackers or input trays that are not being used.

The step to restore one or more of the paper-handling devices to their full power states are provided in a flow chart on FIG. 8. At a step 810, a command is received from the printer to restore full power for this particular paper-handling device. The paper-handling device will now enable power to all of its sensors at a step 812. The paper-handling device will then enable power to all of its drive devices at a step 814.

When power is enabled to the drive devices and to the sensors, logic of the opposite state of the above digital signals will be sent along the control lines 440 and the enable sensor power line 412. This will allow current to flow to the drive circuits and will enable power to be sent to the active sensors (such as optoelectronic sensors having an LED light source).

Once power has been enabled to the sensors and drive devices, a step 816 will set the power state="high," and a message is sent to the print engine to indicate that this particular paper-handling device is now in its normal high power state. Of course, individual paper-handling devices can be placed into their high power states by an individual command for each of these devices from the print engine. Also, a single global command can be sent so that all of the paper-handling devices will simultaneously understand that they are to be placed into their high power states.

The advantages of the power saver mode of the preferred embodiment allow more power to be saved than has been previously possible in printing systems. In addition, the printer can dynamically adjust the printer system's power consumption even while processing print jobs by individually controlling which devices enter the power saver mode and which devices do not. Furthermore, for some of the paper-handling options, it may be desirable to interrupt power (even including bias current) to the driver circuits (e.g., drivers 442, 446, 450, and 460 on FIG. 3) associated with motors that are currently not being used, even during "normal" power mode operations of the printer (as opposed to interrupting power to the drivers only during a power saver mode).

As an example of the type of sensors and motors that may be found in a particular paper-handling device, a duplexer option that can be utilized with a Lexmark laser printer may include four (4) sensors at the paper input, the paper exit, the rear cover, and the front cover. Furthermore, this duplexer can have two (2) separate motors, a paper feed motor (e.g., motor 140 on FIG. 2), and a deflector or diverter motor (e.g., motor 150 on FIG. 2).

In another example, an envelope feeder that can be optionally placed on a Lexmark laser printer can have two sensors: one at the paper exit and, a second as a bin empty indication. The envelope feeder 68 would typically have a single DC motor used for paper feed. Other options for handling paper (or other print media) can include various numbers of sensors and motors without departing from the principles of the present invention.

Some of the major aspects of the present invention first allow use of a smaller power supply for normal operations of the printer by preventing more than certain necessary devices to be operated at a single moment, and during dormant or relative inactive periods of time, the printer can save power by placing its paper-handling devices into a power saver mode. The power saver mode can be dynamically adjusted so that the printer can actually become active using only certain input trays and output stackers while the remaining paper-handling devices remain in a power saver mode.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for reducing the power consumption of a printer, said method comprising:
    (a) providing a printer having a memory circuit for storage of data, a print engine, and a processing circuit;
    (b) inspecting the operating state of a plurality of motor-driven electrically-powered devices controlled by said print engine, and determining which one of said plurality of motor-driven electrically-powered devices is the next to be placed into its ON-state;
    (c) determining if a second one of said plurality of motor-driven electrically-powered devices has previously transitioned to its ON-state and is currently operating in an instantaneous relatively high power consumption state during motor ramp-up; and
    (d) preventing said next one of plurality of motor-driven electrically-powered devices from being placed into its ON-state until after the expiration of said instantaneous relatively high power consumption state during motor ramp-up of said second one of said plurality of motor-driven electrically-powered devices.

2. The method as recited in claim 1, wherein said act of determining is performed by waiting for the expiration of a predetermined time interval after said second one of the plurality of motor-driven electrically-powered devices transitioned to its ON-state.

3. The method as recited in claim 2, wherein said predetermined time interval represents an instantaneous "peak" power consumption period during motor ramp-up for said second one of the plurality of motor-driven electrically-powered devices, after which it operates at a substantially steady-state power consumption value having a magnitude that is less than said instantaneous relatively high power consumption state.

4. The method as recited in claim 1, wherein said act of determining is performed by waiting for a message sent by said second one of said plurality of motor-driven electrically-powered devices is received by said print engine, wherein said message contains information that said second one of said plurality of motor-driven electrically-powered devices has completed an operation during which it exhibited its instantaneous high power consumption state.

5. The method as recited in claim 4, further comprising: sending a "start" message from said print engine to said second one of said plurality of motor-driven electrically-powered devices, after which said second one of said plurality of motor-driven electrically-powered devices temporarily operates in said instantaneous relatively high power consumption state during motor ramp-up; and wherein said message sent by said second one of said plurality of motor-driven electrically-powered devices and received by said print engine represents an "acknowledgement" message before starting the next of the plurality of motor-driven electrically-powered devices.

6. The method as recited in claim 5, wherein said "start" and "acknowledgement" messages that are communicated to and from said print engine are carried via a "smart devices communications bus" that runs between said print engine and said plurality of motor-driven electrically-powered devices.

7. The method as recited in claim 1, wherein each of said plurality of motor-driven electrically-powered devices comprises one of an input tray, output tray, output stacker, duplexer, multipurpose tray, and envelope feeder.

8. A printing apparatus, comprising:
    (a) a memory circuit for storage of data;
    (b) a print engine that is in communication with a plurality of motor-driven electrically-powered devices;
    (c) a processing circuit that is configured to control the operating state of each of said plurality of motor-driven electrically-powered devices, said processing circuit being further configured to:
        (i) determine which one of said plurality of motor-driven electrically-powered devices is the next to be placed into its ON-state;
        (ii) determine if a second one of said plurality of motor-driven electrically-powered devices has transitioned to its ON-state and is currently operating in an instantaneous relatively high power consumption state during motor ramp-up; and
        (iii) prevent the next one of plurality of motor-driven electrically-powered devices from being placed into its ON-state until after the expiration of said instantaneous relatively high power consumption state during motor ramp-up of said second one of said plurality of motor-driven electrically-powered devices.

9. The printing apparatus as recited in claim 8, wherein said processing circuit is further configured to wait for the expiration of a predetermined time interval after said second one of the plurality of motor-driven electrically-powered devices transitioned to its ON-state, before allowing the next one of plurality of motor-driven electrically-powered devices to be placed into its ON-state.

10. The printing apparatus as recited in claim 9, wherein said predetermined time interval represents an instantaneous "peak" power consumption period during motor ramp-up for said second one of the plurality of motor-driven electrically-powered devices, after which it operates at a substantially steady-state power consumption value having a magnitude that is less than said instantaneous relatively high power consumption state.

11. The printing apparatus as recited in claim 8, wherein said processing circuit is further configured to wait for a message sent by said second one of said plurality of motor-driven electrically-powered devices is received by said print engine, wherein said message contains information that said second one of said plurality of motor-driven electrically-powered devices has completed an operation during which it exhibited its instantaneous high power consumption state, before allowing the next one of plurality of motor-driven electrically-powered devices to be placed into its ON-state.

12. The printing apparatus as recited in claim 11, wherein said processing circuit is further configured to send a "start" message from said print engine to said second one of said plurality of motor-driven electrically-powered devices, after which said second one of said plurality of motor-driven electrically-powered devices temporarily operates in said instantaneous relatively high power consumption state during motor ramp-up; and wherein said message sent by said second one of said plurality of motor-driven electrically-powered devices and received by said print engine represents an "acknowledgement" message before starting the next of the plurality of motor-driven electrically-powered devices.

13. The printing apparatus as recited in claim 12, wherein said "start" and "acknowledgement" messages that are communicated to and from said print engine are carried via a "smart devices communications bus" that runs between said print engine and said plurality of motor-driven electrically-powered devices.

14. The printing apparatus as recited in claim 8, wherein each of said plurality of motor-driven electrically-powered devices comprises one of an input tray, output tray, output stacker, duplexer, multipurpose tray, and envelope feeder.

15. A method for reducing the power consumption of a printer, said method comprising:

(a) providing a printer having a memory circuit for storage of data, a print engine, and a processing circuit;

(b) inspecting the operating state of said printer to determine if one or more of a plurality of motor-driven paper-handling devices that are controlled by said print engine are in a substantially active operating state or are in a substantially dormant operating state; and (c) sending, via a "smart devices communications bus" that runs between said print engine and said plurality of motor-driven paper-handling devices, a command to at least one of said plurality of motor-driven paper-handling devices so as to place said at least one of said plurality of motor-driven paper-handling devices into a "power saver mode" of operation.

16. The method as recited in claim 15, wherein said "smart devices communications bus" that runs between said print engine and said plurality of motor-driven paper-handling devices comprises a two-wire serial bus, one wire for transmitting data messages from said print engine, and a second wire for receiving data messages at said print engine.

17. The method as recited in claim 15, wherein said act of sending a command comprises transmitting a single data message to all of said motor-driven paper-handling devices which then are substantially simultaneously placed into said "power saver mode" of operation.

18. The method as recited in claim 15, wherein said act of sending a command comprises transmitting a data message to only a single selected one of said motor-driven paper-handling devices which then is placed into said "power saver mode" of operation, thereby exhibiting individual control of said motor-driven paper-handling devices.

19. The method as recited in claim 15, further comprising: sending, via said "smart devices communications bus" that runs between said print engine and said plurality of motor-driven paper-handling devices, a command to a selected one of said plurality of motor-driven paper-handling devices that presently is in a power saver mode of operation, said command causing said selected one of the plurality of motor-driven paper-handling devices to go into a "full power mode" of operation.

20. The method as recited in claim 18, further comprising; sending, via said "smart devices communications bus" that runs between said print engine and said plurality of motor-driven paper-handling devices, a command to a selected one of said plurality of motor-driven paper-handling devices that presently is in a power saver mode of operation, said command causing said selected one of the plurality of motor-driven paper-handling devices to go into a "full power mode" of operation.

21. The method as recited in claim 17, further comprising: sending, via said "smart devices communications bus" that runs between said print engine and said plurality of motor-driven paper-handling devices, a command comprising a single data message to all of said plurality of motor-driven paper-handling devices, said command causing each of the plurality of motor-driven paper-handling devices that presently are in a power saver mode of operation to go into a "full power mode" of operation.

22. The method as recited in claim 15, wherein each of said plurality of motor-driven paper-handling devices that are controlled by said print engine each comprises one of an input tray, output tray, output stacker, duplexer, multipurpose tray, and envelope feeder.

23. The method as recited in claim 22, wherein the act of placing at least one of said plurality of motor-driven paper-handling devices that is controlled by said print engine into a power saver mode of operation causes the electrical power to be effectively interrupted for each motor-controller circuit of a motor, and for any active current-consuming component of each paper positioning sensor of said at least one selected motor-driven paper-handling device.

* * * * *